May 7, 1957  G. SOLWAY  2,791,462
HORTICULTURAL AND AGRICULTURAL IMPLEMENT
Filed Oct. 20, 1954  2 Sheets-Sheet 1

INVENTOR
GEORGE SOLWAY
BY Frederick E. Hane
ATTORNEY

May 7, 1957 G. SOLWAY 2,791,462
HORTICULTURAL AND AGRICULTURAL IMPLEMENT
Filed Oct. 20, 1954 2 Sheets-Sheet 2

INVENTOR
GEORGE SOLWAY
BY Frederick E. Hane
ATTORNEY

United States Patent Office 2,791,462
Patented May 7, 1957

2,791,462

HORTICULTURAL AND AGRICULTURAL IMPLEMENT

George Solway, Marazanvose, Truro, Cornwall, England

Application October 20, 1954, Serial No. 463,455

1 Claim. (Cl. 294—104)

The invention provides a horticultural and agricultural implement of new or improved construction for use in extracting weeds or plants, without the user having to stoop. According to the invention, the implement comprises a pair of jaws mounted at or near the end of a shaft, and a hand lever located at some distance along the shaft, said hand lever being operable to close and open the jaws thereby causing them to grip and release a weed or plant. Preferably, the implement comprises also a supplementary tool, such as a hoe blade, mounted at or near the said end of the shaft.

Further features and advantages of the invention will sufficiently appear from the appended claims, when read in the light of the following description of a particular form of the invention, reference being made to the accompanying drawing. In the drawing Figure 1 is a side elevation of the implement with part of the shaft broken away;

Figure 1:
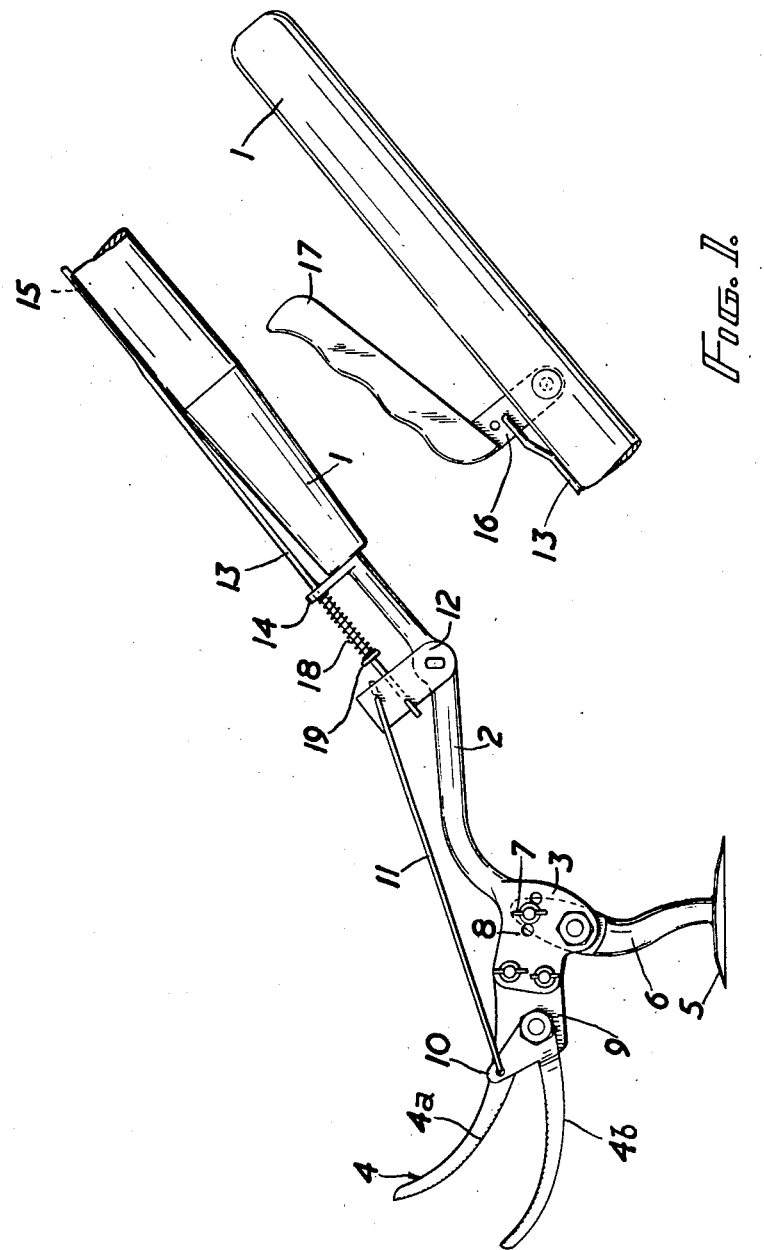

Projecting from the lower end of a wooden shaft 1, which is approximately 4 ft. long, is an extension member in the form of a cranked metal rod or neck 2, whose end is flattened to constitute a mounting plate 3. To this plate are removably secured a pair of jaws, 4a and 4b, (which are thus in a position spaced from the principal axis of the shaft) and a hoe blade 5.

The hoe blade 5, is in the form of a substantially flat plate, having a supporting arm 6 upstanding from the centre of its upper face, the upper end of this arm being flattened and detachably secured against the face of the mounting plate 3 by means of a pair of bolts. One of these bolts is provided with a wing nut 7 and can be passed through any one of three alternative holes 8 provided in the mounting plate, thus allowing the blade to be set at different angles to the shaft to suit different users. The hoe blade, which lies nearly flat upon the ground during use, is elongated laterally (Figure 2) and has its front and rear edges convexly curved; the end edges of the blade may be of notched or re-entrant V shape as shown, or they may be straight and tapered outwardly from the front to the rear edge of the blade. All the edges of the blade are sharpened, so that it is effective when moved in any direction. For certain tasks it may be desirable to use, instead of the blade 5, an ordinary hoe blade of well known design, adapted for attachment to the mounting plate in the same way as the blade 5.

The upper jaw 4a is fixed, and is formed integral with a clamping plate 9 which is detachably secured to the mounting plate 3 by a pair of bolts provided with wing nuts. The lower jaw 4b is movable, its bifurcated root end being pivotally connected to the clamping plate 9. Integral with the movable arm is an upwardly and forwardly projecting operating arm 10 provided with an aperture which receives the looped end of a short operating rod 11. The other end of this rod is cranked and passed through an aperture in a short lever 12, whose bifurcated end embraces and is pivoted to the neck 2 a short distance below the end of the shaft 1. The lever 12 also receives the cranked lower end of a second operating rod 13 which passes through an eye 14 on the neck 2, and extends upwards in a groove 15 formed in the shaft. The upper end of this second rod is cranked and engaged in one of the apertures in an operating lever 16, which projects outwards from the shaft 1, at a convenient distance (say 8") from its upper end, and is pivoted on a bolt passed diametrically through the shaft. Secured to the outer end of this operating lever is a finger grip 17. The operating rods 11 and 13 are normally urged downwardly, to hold the jaws open, by a helical compression spring 18 surrounding the lower part of the rod 13 and engaging between the above mentioned eye 14 and a collar 19 secured to the rod, but on pressing the finger grip 17 towards the shaft, the operating rods are pulled up against the action of the spring, to close the jaws.

Figure 2:
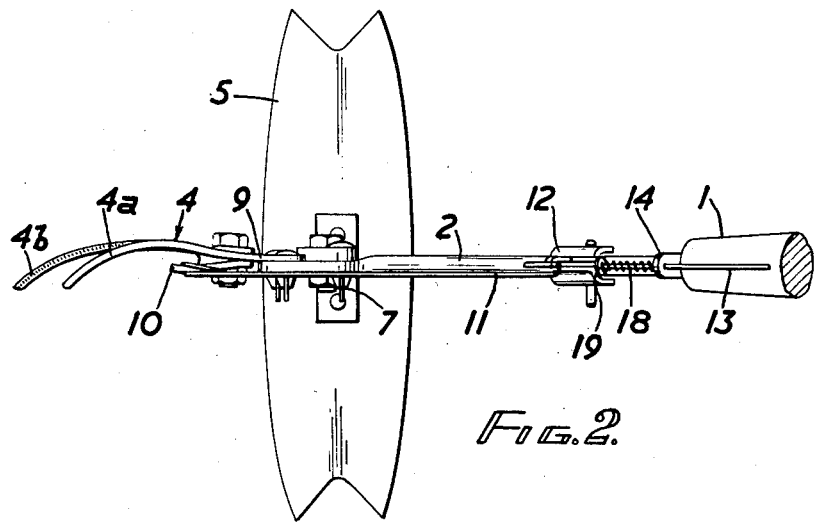
Figure 2 is a top plan view of part of the implement shown in Figure 1.
Figure 3:
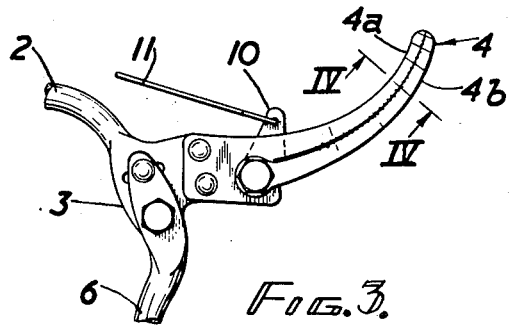
Figure 3 is a fragmentary side elevation, showing the jaws closed together.
Figure 4:
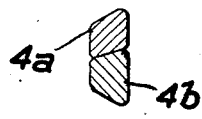
Figure 4 is a section on line IV—IV of Figure 3.

The jaws 4a and 4b are shaped as steel prongs or spurs tapering to blunt points. When the hoe blade is flat on the ground, the shaft extends upward and rearwards, and the jaws extend in a general forward direction. The latter are curved both upwards, in a plane containing the shaft, (Figure 1) and to one side, away from that plane (Figure 2). Jaws curving to the left are illustrated, but jaws of opposite hand may be provided if desired. When the jaws are closed together, (Figures 3 and 4) their convex surfaces lie in the same plane, and in use these surfaces will lie nearly flat upon the ground. In this position, the pivotal axis of the movable jaw 4b (which is now in front of the other) is nearly vertical and the meeting faces of the two jaws (which are ridged as shown to improve their grip) are also nearly vertical. As shown in Figure 4 the outer edges of the jaws (that is the front edge 4b' of the front jaw and the rear edge 4a' of the rear jaw) are inclined to the vertical, so that when the jaws are closed together to afford each other mutual support they can be used as a push or draw hoe.

The tool described above is particularly useful for such tasks as weeding and thinning rows of seedling plants, for example in singling root crops, the hoe blade being used in the usual way to remove easily accessible weeds and excess plants (the jaws being positioned so that they do not in any way obstruct the use of the hoe), while by simply turning over the tool the jaws can be brought into use to remove weeds or plants which would otherwise have to be removed by hand, thereby saving much time and avoiding all stooping by the user. The tool will be found useful for many other tasks also, since either the hoe blade or the pair of jaws can be removed, if desired, and the hoe blade can be replaced by some other supplementary tool, for example a rake head.

What is claimed is:

A horticultural and agricultural implement for extracting weeds and other plants comprising a longitudinal shaft terminating at one extremity in a cranked extension member lying in a plane parallel to the longitudinal axis of said shaft, a first jaw including a tapering prong having a base end secured to said extension member and having an opposite end curving in a first direction parallel to said plane and towards the opposite extremity of said shaft presenting a continuously curved convex edge facing away from said shaft, said opposite end of said first jaw being further curved in a second direction away from said plane, a second jaw including a tapering and continuously curved prong having one end pivotally secured to said extension member for limited rotation about an axis perpendicular to said plane, said second jaw being curved away from said plane in a direction corresponding to the curving of said first jaw and having a continuously curved concave edge opposed to and facing said convex edge of said first jaw, said convex and concave edges of said respective first and second jaws being of similar shape and being adapted to engage and fit closely together along the whole lengths of the jaws when the second jaw is rotated about said pivot into closing engagement with said first jaw, said jaws when in open position having a gap therebetween that is widest at the ends opposite from said pivot engagement and continuously tapers in width towards said base, a hand lever disposed on said shaft and connected to said second jaw for selectively rotating said second jaw into closing and opening engagement relative to said first jaw, and a spring associated with said hand lever normally urging said shaft into jaw opening position.

References Cited in the file of this patent

UNITED STATES PATENTS

| | | |
|---|---|---|
| 7,136–X | Hinkley | June 23, 1832 |
| 392,412 | Dages | Nov. 6, 1888 |
| 514,419 | Evans | Feb. 6, 1894 |
| 941,644 | Miller | Nov. 30, 1909 |
| 1,297,319 | Bullard | Mar. 18, 1919 |
| 1,572,426 | Foote | Feb. 9, 1926 |
| 1,687,986 | Miller | Oct. 16, 1928 |